Patented June 25, 1946

2,402,645

UNITED STATES PATENT OFFICE 2,402,645

PREPARATION OF THIONAPHTHOLS

Wilbur A. Lazier, New Castle County, Frank K. Signaigo, Wilmington, and Leonard G. Wise, New Castle County, Del., assignors to E. I. du Pont de Nemours & Company, Wilmington, Del., a corporation of Delaware No Drawing. Application April 13, 1940, Serial No. 329,584

27 Claims. (Cl. 260—609)

This invention relates to improvements in the preparation of thionaphthols from naphthalene and to new thionaphthol compositions.

It has previously been the practice in chemical industry to prepare thionaphthols by energetic reduction of the sulfone chloride; e. g., with zinc and dilute sulfuric acid. Laboratory methods include distilling sodium naphtalene sulfonate with potassium sulfhydrate and reacting naphthyl magnesium bromide with sulfur, followed by decomposition of the resulting sulfur compound with acids. All of these prior art methods involve an excessive consumption of reagents and in most cases the yields of the desired thionaphthols are low. Moreover, difficult problems are encountered in isolating the desired products in a form suitable for commercial use.

It is accordingly an object of this invention to provide a new method for preparing thionaphthols in high yields which is readily adaptable to operation on a commercial scale. Another object is to prepare thionaphthols from naphthalene. Still another object is to prepare thionaphthols by a process which will produce the desired product in an easily isolable form. Other objects will be apparent from the following description of the invention.

These objects are accomplished by reacting naphthalene with a sulfurizing agent such as a source of bivalent sulfur, preferably in the presence of a sulfurization catalyst, and reducing the resulting sulfurized naphthalene to a product containing a substantial amount of thionaphthols. Such a sulfurizing agent as used herein may consist, for example, of sulfur, sulfur halides, mixtures of these, highly sulfurized compounds of carbon, etc.

The more detailed practice of this invention is illustrated by the following examples, wherein parts are given by weight unless otherwise stated.

Example I

Three hundred eighty-four parts of commercial naphthalene was placed in a jacketed reactor fitted with an efficient agitator and capable of withstanding the corrosive action of dry hydrogen chloride. The naphtalene was then heated to 100° C. and 5 parts of granulated anhydrous zinc chloride was added. The molten naphthalene and zinc chloride mixture was stirred continuously while 68 parts of commercial sulfur monochloride was added during a period of one-half hour. Copious evolution of hydrogen chloride commenced as soon as the addition of sulfur chloride was started. The reaction was mildly exothermic. To maintain the temperature at 100° C.±5° C. it was found necessary to reduce the amount of heating and to circulate cooling water through the reactor jacket. The reaction was complete as soon as the evolution of hydrogen chloride ceased. This point was reached within a few minutes after the addition of the last of the sulfur chloride. The dissolved residual hydrogen chloride was removed by blowing nitrogen through the molten mixture. The amount of hydrogen chloride evolved was almost the quantitative equivalent of the chlorine in the sulfur chloride used.

The molten mixture was decanted from undissolved zinc chloride catalyst and charged into a high-pressure steel autoclave, together with 10 parts of a cobalt sulfide catalyst prepared as follows. A solution of 15.5 parts of cobalt chloride hexahydrate dissolved in 110 parts of water was mixed with a solution of 15.5 parts of sodium sulfide nonahydrate and 4.1 parts of sulfur dissolved in 100 parts of water. The black precipitate was filtered to remove most of the water and then heated with naphthalene to remove the last portion of water. The catalyst was used in the form of a solid suspension in naphthalene. After adding the catalyst hydrogen was charged into the autoclave to a pressure of 1500 lbs. per sq. in. and the autoclave heated with suitable agitation at 150° C. Rapid hydrogenation occurred as evidenced by a decrease in the pressure. After two hours no further hydrogen absorption was noted and the autoclave was cooled to 100° C. The contents of the autoclave were filtered while still in a molten condition to separate the catalyst. The autoclave and catalyst were washed with benzene and the washings added to the reaction product. The unreacted naphthalene together with the benzene used and some hydrogen sulfide that had formed during the hydrogenation process were fractionally distilled from the reaction mixture at a pressure of 25 mm., leaving the less volatile thionaphthols as a distillation residue. The amount of product thus obtained was 110 parts while 290 parts of naphthalene were recovered unchanged. The product was a yellow colored oil that was soluble in benzene and chloroform but insoluble in water. Its density was approximately $d_4^{25}=1.2$ and its refractive index was greater than $n_D^{25}=1.7$. The product contained approximately 18% of total sulfur, 11% of thiol sulfur and 0.1% of chlorine. By further vacuum distillation, it was found possible to separate the product into pure thio-alpha naphthol (B. P. 106° C. at 1.5 mm.) and a nonvolatile resin containing naphthyl sulfides and thionaphthols of higher molecular weight.

Example II

Naphthalene was reacted with sulfur monochloride exactly as described in Example I. After the reaction was complete, the crude product, instead of being charged into a hydrogenation autoclave as described above, was added to 500 parts of 20° Bé. hydrochloric acid in an acid-proof vat. The mixture was then heated at 100° C. while zinc dust was added in small portions until the further addition of a portion of zinc dust with subsequent boiling for one hour did not increase the amount of thionaphthols present. The thiol content was determined by dissolving a sample of the organic layer in chloroform and titrating with standard iodine solution. The crude product was separated from the aqueous layer, and the unreacted naphthalene was distilled from the product at a pressure of 25 mm. The product obtained was similar to that described in the preceding example.

*Example III*

A mixture of 384 parts of naphthalene and 64 parts of powdered sulfur was heated and stirred at 100° C. while powdered anhydrous aluminum chloride was added in small portions until the evolution of hydrogen sulfide practically ceased. This point was reached when 27 parts of aluminum chloride had been added. The crude reaction product was liquefied by adding 300 parts of benzene, and the warm stirred solution was treated with 25 parts of water to hydrolyze the complex addition compound. The solution was then filtered and the water removed by distillation as a benzene-water binary. The residual benzene solution of sulfurized naphthalene was charged into a high-pressure steel autoclave, together with 10 parts of cobalt sulfide catalyst prepared as described in Example I. Hydrogen was pressed into the autoclave to a pressure of 2000 lbs. per sq. in., and the autoclave agitated and heated at 150° C. until no further absorption of hydrogen occurred. The reaction mixture was filtered to separate the catalyst. The benzene and unreacted naphthalene were separated from the product by distillation at a pressure of 25 mm., the distillation being stopped when no more naphthalene distilled over. The product obtained as the distillation residue contained a substantial proportion of thionaphthols.

While sulfur monochloride is the preferred sulfurizing agent because it is low in cost and leads to high yields of thionaphthols, sulfur or sulfur halides generally or combinations of these with each other may be used in this process.

It is usually necessary to employ a catalyst for the sulfurization of naphthalene since otherwise with sulfur chloride chlorination may occur. Volatile metal chlorides having a boiling point below 800° C. at 760 mm. and substances that are converted to these under the reaction conditions are effective sulfurization catalysts, especially in conjunction with the use of sulfur chlorides. Examples of suitable catalysts in this class are aluminum chloride, bismuth chloride, iron chlorides, mercury chlorides, tin chlorides, antimony chlorides, tantalum pentachloride, titanium tetrachloride, and zinc chloride. It is not essential in all cases to add the metal halide catalyst as such since in many cases this can be formed in situ. Compounds of the metals other than the chlorides may be used since under the conditions of the reaction they are at least partially converted to the chloride. Examples of some of these compounds are ferrous sulfate, ammonium molybdate, molybdenum trioxide, metallic zinc and the like. Still other materials are active sulfurization catalysts as, for example, silver nitrate, iodine, potassium iodide, phosphorus pentoxide and concentrated sulfuric acid.

Anhydrous aluminum and iron chlorides are especially suitable catalysts for the sulfurization of naphthalene with elementary sulfur. In practice, the minimum amount of catalyst necessary to bring about substantially complete reaction in a practicable length of time is generally used.

The ratio of naphthalene to sulfurizing agent used affects to some extent the type of final product obtained. For example, if a high ratio of naphthalene to sulfurizing agent is used, then the final reduced product will contain a relatively larger proportion of monothionaphthol. On the other hand, if a lower ratio of naphthalene to sulfurizing agent is used, then the the final product will contain a relatively larger proportion of products of higher molecular weight and containing more than one thiol group per molecule. The addition of the naphthalene to the sulfurizing agent likewise favors the formation of polythiols.

The use of an inert solvent during the condensation step, while not essential, may be desirable in some cases as, for example, when the ratio of naphthalene to sulfurizing agent employed is low. Examples of such solvents are benzene, chloroform, ethylene dichloride, tetrachloroethane, carbon disulfide, and the like. The temperature at which the sulfurization reaction is carried out may likewise be varied over a considerable range. Reaction proceeds in some cases at temperatures as low as 25° C. but in general temperatures of 50° to 150° C. are preferred because a shorter time is required for the completion of the reaction under these conditions.

The sulfurized naphthalene intermediate can be reduced to a product containing thionaphthols by any of several methods that are effective for reducing organic disulfides to thiols, several of which are listed in Houben's "Die Methoden der Organischen Chemie" 3rd ed., vol. 2, pp. 439-440. Catalytic hydrogenation processes such as have been illustrated in some of the foregoing examples are preferred since these are generally more economical and yield a product that requires a minimum of purification. The use of a cobalt polysulfide hydrogenating catalyst under specified conditions of temperature and pressure has been indicated, but other catalysts and conditions may be employed as well. In general, sulfides of cobalt, molybdenum, nickel, and iron are effective in catalyzing the hydrogen reduction of the sulfurized naphthalene. Pressures from about 100 lbs. per sq. in. upwards and temperatures from about 100° C. up to temperatures at which the thiol groups are cleaved by hydrogen from the naphthalene nucleus may be employed. The sulfurized naphthalene may also be converted to thionaphthols by heating with an excess of hydrogen sulfide under pressure, preferably in the presence of a metal sulfide catalyst.

Other reducing systems that are capable of converting the sulfide linkages in the sulfurized naphthalene to thionaphthols likewise may be used. In general, systems that liberate so-called "nascent" hydrogen such as zinc dust and hydrochloric acid are most effective. Such reducing agents usually comprise a metal standing above hydrogen in the electromotive series and a substance having an easily replaceable hydrogen atom as, for example, zinc, iron, or tin in combination with mineral or organic acids, zinc or aluminum with aqueous alkalies, mercury amalgam with water, and sodium with alcohols. Other reducing systems that may be used are sodium hydrosulfite, phosphorus and hydroiodic acid, sodium sulfides, and also electrolytic reduction.

One of the important features of this invention is that in practice it is not necessary to isolate the intermediate produce prepared by sulfurizing the naphthalene. As actually carried out, therefore, this invention comprehends the conversion of naphthalene and a source of bivalent sulfur directly into thionaphthols which are valuable as dye intermediates, rubber peptizing agents, resin modifying agents, and for many other uses.

It is apparent that many widely different embodiments of this invention may be made without departing from the spirit and scope thereof and therefore it is not intended that the invention shall be limited except as indicated in the appended claims.

We claim:

1. The process for the preparation of thionaphthols which comprises bringing naphthalene and a sulfurizing agent into contact with a sulfurization catalyst at a temperature between 25° and 150° C., and reducing the resulting sulfurized naphthalene to a product containing thionaphthols.

2. The process which comprises reacting naphthalene with sulfur in the presence of a sulfurization catalyst, and thereafter reducing the sulfurized naphthalene.

3. The process which comprises reacting naphthalene with a sulfur halide, and thereafter reducing the sulfurized naphthalene.

4. The process in accordance with claim 3 characterized in that the sulfur halide is a sulfur chloride.

5. The process in accordance with claim 3 characterized in that the sulfur halide is sulfur monochloride and the reaction is carried out in the presence of a sulfurization catalyst.

6. The process for the preparation of thionaphthols which comprises sulfurizing naphthalene by contacting same with a sulfur halide under sulfurizing conditions and catalytically hydrogenating the resulting sulfurized naphthalene in the presence of a sulfactive hydrogenation catalyst to a product containing thionaphthols.

7. The process in accordance with claim 6 characterized in that the sulfactive hydrogenation catalyst is a ferrous metal sulfide.

8. The process in accordance with claim 6 characterized in that the sulfactive hydrogenation catalyst is molydenum sulfide.

9. The process for the preparation of thionaphthols which comprises sulfurizing naphthalene by contacting same with a sulfurizing agent under sulfurizing conditions and reducing the resulting sulfurized naphthalene to a product containing thionaphthols by treatment with hydrogen formed in situ.

10. The process in accordance with claim 9 characterized in that the reduction is carried out by treating the sulfurized naphthalene with a metal and a substance from which said metal will liberate hydrogen.

11. The process in accordance with claim 9 characterized in that the reduction is carried out by catalytically hydrogenating the sulfurized naphthalene in the presence of a sulfactive hydrogenation catalyst.

12. A process for the preparation of thionaphthols which comprises reacting naphthalene with sulfur monochloride in the presence of a volatile metal chloride boiling below 800° C. at 760 mm., and catalytically hydrogenating the resulting sulfurized naphthalene in the presence of a catalyst selected from the group of sulfides of the ferrous group metals and molybdenum.

13. A process for the preparation of thio-alpha-naphthol which comprises reacting an excess of naphthalene with sulfur monochloride in the presence of a volatile metal chloride boiling below 800° C. at 760 mm., hydrogenating the resulting sulfurized naphthalene in the presence of a catalyst selected from the group of sulfides of the ferrous group metals and molybdenum, and isolating the thio-alpha-naphthol from the hydrogenated product.

14. The process of claim 12 in which the metal halide catalyst is zinc chloride.

15. The process of claim 12 in which the hydrogenating catalyst is a cobalt sulfide.

16. The process of claim 13 in which the metal halide is zinc chloride.

17. The process of claim 13 in which the hydrogenating catalyst is a cobalt sulfide.

18. The process for producing thionaphthols which comprises heating naphthalene with a source of bivalent sulfur and without isolating the intermediate sulfides, reducing the said naphthyl sulfides to thionaphthols.

19. The process for producing thionaphthols which comprises sulfurizing naphthalene by contacting same with a sulfurizing agent under sulfurizing conditions and thereafter catalytically hydrogenating the sulfurized naphthalene.

20. The process for preparing thionaphthols which comprises bringing naphthalene and a sulfurizing agent into contact with a sulfurization catalyst and thereafter catalytically hydrogenating the sulfurized naphthalene.

21. The process for the preparation of thionaphthols which comprises bringing naphthalene and a sulfurizing agent into contact with a sulfurization catalyst at a temperature between 25° and 150° C., and catalytically hydrogenating the resulting sulfurized naphthalene to a product containing thionaphthols.

22. The process which comprises reacting naphthalene with sulfur in the presence of a sulfurization catalyst and thereafter catalytically hydrogenating the sulfurized naphthalene.

23. The process which comprises sulfurizing naphthalene by contacting same with a sulfur halide under sulfurizing conditions and thereafter catalytically hydrogenating the sulfurized naphthalene.

24. The process in accordance with claim 23 characterized in that the sulfur halide is a sulfur chloride.

25. The process in accordance with claim 23 characterized in that the sulfur halide is sulfur monochloride and the reaction is carried out in the presence of a sulfurization catalyst.

26. The process for the preparation of thionaphthols which comprises sulfurizing naphthalene by contacting same with a sulfurizing agent under sulfurizing conditions and catalytically hydrogenating the resulting sulfurizing naphthalene in the presence of a sulfactive hydrogenation catalyst whose active catalytic component is nickel.

27. The process for the production of a sulfurized naphthalene which comprises reacting naphthalene with a sulfur chloride in the presence of an aluminum chloride sulfurization catalyst.

WILBUR A. LAZIER.
FRANK K. SIGNAIGO.
LEONARD G. WISE.